United States Patent
Hamby et al.

(10) Patent No.: US 7,964,848 B2
(45) Date of Patent: Jun. 21, 2011

(54) SKIN CONTAMINATION DOSIMETER

(75) Inventors: David M. Hamby, Corvallis, OR (US); Abdollah T. Farsoni, Corvallis, OR (US); Edward Cazalas, Corvallis, OR (US)

(73) Assignee: The State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 12/916,362

(22) Filed: Oct. 29, 2010

(65) Prior Publication Data

US 2011/0101228 A1     May 5, 2011

Related U.S. Application Data

(60) Provisional application No. 61/256,552, filed on Oct. 30, 2009.

(51) Int. Cl.
 *G01T 1/20* (2006.01)
(52) U.S. Cl. ............................................... 250/362
(58) Field of Classification Search ............. 250/362
 See application file for complete search history.

(56) References Cited

U.S. PATENT DOCUMENTS

| | | | |
|---|---|---|---|
| 2,942,109 A | 6/1960 | Bell et al. | |
| 3,892,971 A | 7/1975 | Arthur et al. | |
| 4,092,539 A * | 5/1978 | Pao et al. | 250/336.1 |
| 4,101,769 A | 7/1978 | Bingo et al. | |
| 4,156,139 A | 5/1979 | Bingo et al. | |
| 4,251,744 A * | 2/1981 | Green | 327/63 |
| 4,286,165 A | 8/1981 | Jones et al. | |
| 4,506,157 A | 3/1985 | Keller | |
| 4,527,063 A * | 7/1985 | Kronenberg et al. | 250/370.06 |
| 4,677,299 A * | 6/1987 | Wong | 250/363.03 |
| 4,914,300 A | 4/1990 | Kalish | |
| 5,008,546 A | 4/1991 | Mazziotta et al. | |
| 5,067,090 A | 11/1991 | Seeman | |
| 5,087,818 A | 2/1992 | Bellian et al. | |
| 5,905,262 A | 5/1999 | Spanswick | |
| 7,098,463 B2 | 8/2006 | Adamovics | |
| 7,141,804 B1 | 11/2006 | Akselrod et al. | |
| 7,368,722 B2 | 5/2008 | Berthold et al. | |
| 7,683,334 B2 | 3/2010 | Farsoni et al. | |
| 2005/0087693 A1 * | 4/2005 | Sumiya et al. | 250/367 |

(Continued)

OTHER PUBLICATIONS

S. Usuda, "Simultaneous counting of alpha, beta (gamma)-rays and thermal neutrons with phoswitch detectors consisting of ZnS(Ag), 6Li-galss and/or NE102A scintillators," 1995, Nuclear Instruments and Methods in Physics Research A, vol. 356, pp. 334-338.*

(Continued)

*Primary Examiner* — Kiho Kim
(74) *Attorney, Agent, or Firm* — Lumen Patent Firm

(57) ABSTRACT

A technique and device provides absolute skin dosimetry in real time at multiple tissue depths simultaneously. The device uses a phoswich detector which has multiple scintillators embedded at different depths within a non-scintillating material. A digital pulse processor connected to the phoswich detector measures a differential distribution (dN/dH) of count rate N as function of pulse height H for signals from each of the multiple scintillators. A digital processor computes in real time from the differential count-rate distribution for each of multiple scintillators an estimate of an ionizing radiation dose delivered to each of multiple depths of skin tissue corresponding to the multiple scintillators embedded at multiple corresponding depths within the non-scintillating material.

7 Claims, 4 Drawing Sheets

U.S. PATENT DOCUMENTS

2010/0264320 A1* 10/2010 Takayama et al. ............ 250/362

OTHER PUBLICATIONS

Farsoni, A.T.; Hamby, D.M. A system for simultaneous beta and gamma spectroscopy. Nuclear Instruments and Methods in Physics Research A. 578: 528-536; 2007.

Kriss, A.A.; Hamby, D.M. Beta spectroscopy with a large-area avalanche photodiode module and a plastic scintillator. Nuclear Instruments and Methods in Physics Research, Section A. 525(3): 553-559; 2004.

Usuda, S.; Abe, H.; Mihara, A. Phoswich detectors combining doubly or triply ZnS(Ag), NE102A, BGO and/or NaI(Tl) scintillators for simultaneous counting of alpha, beta and gamma rays. Nuclear Instruments and Methods in Physics Research, Section A. 340A: 540-545; 1994.

Yamamoto, S.; Matsumoto, K; Sakamoto, S.; Tarutani, K.; Minato, K.; Senda, M. An intra-operative positron probe with background rejection capability for FDG-guided surgery. Annals of Nuclear Medicine. 19(1):23-28; 2005.

* cited by examiner

400 bin the differential count-rate distribution as function of pulse height H into pulse-height bins of equal width

402 convert the binned differential count-rate distribution as a function of pulse height into a binned pulse-height distribution as a function of deposited energy

404 compute an energy absorption distribution from the binned pulse-height distribution as a function of deposited energy

406 integrate the energy absorption distribution to obtain a total energy deposited

408 calculate and output the estimated dose from the total energy and the mass of the scintillation layer.

*Fig. 4*

SKIN CONTAMINATION DOSIMETER

CROSS-REFERENCE TO RELATED APPLICATIONS

This application claims priority from U.S. Provisional Patent Application 61/256,552 filed Oct. 30, 2009, which is incorporated herein by reference.

STATEMENT OF GOVERNMENT SPONSORED SUPPORT

This invention was made with Government support under contract DE-FG07-02ID14331 awarded by U.S. Department of Energy. The Government has certain rights in this invention.

FIELD OF THE INVENTION

The present invention relates generally to methods and devices for radiation dosimetry. More specifically, it relates to real-time skin dosimetry of ionizing radiation at multiple tissue depths in a single application.

BACKGROUND OF THE INVENTION

The decay of unstable atoms is often accompanied by the energetic emission of ionizing radiation in the form of particles or electromagnetic waves. These emissions may take various forms such as alpha particles, beta particles (electrons), gamma rays (photons), neutrons, and positrons. Due to their very short range in human tissue, the energy from this radiation is largely absorbed by the tissue and can result in very high radiation doses. The dose can be especially large in the case where a radioactive material (e.g., a "hot particle") is in contact with the skin. Since tissue is prone to adverse biological responses to the absorption of this nuclear energy, it is quite important to estimate the hot-particle dose, i.e., the amount of energy per unit mass (of tissue), given that a person was or may have been exposed to a hot particle on their skin or on the clothing above their skin.

Such dose estimates are needed for workers in the nuclear power industry. Radiopharmaceutical companies and hospitals may also employ the use of radiation-emitting nuclides in their operations. These nuclides could be in a solid physical form, in which case they may behave like hot particles, or they may exist in liquid form. As liquids, skin contamination could occur if the liquid were spilled or otherwise came into contact with the skin or clothing. Whether solid or liquid, exposure to tissue by these hot particles or liquid radio-nuclides would result in the necessity to perform a dose assessment following the skin contamination event. In addition to these biological reasons, the U.S. Nuclear Regulatory Commission requires a licensee to document radiation exposures, and they are quite specific regarding exposures to the skin.

A wide variety of devices and techniques have evolved to assist in dose assessment. Commonly known techniques are based on the use of a thermoluminescent dosimeter (TLD) to register radiation dose to skin layers and deep tissue. These passive devices are typically worn by workers and use TLD phosphors to record accumulated radiation energy deposition information. At a later time and location, the integrated radiation dose to the TLD phosphors is measured and translated to estimates of shallow and deep dose in tissue. These passive techniques, however, do not provide real-time, on-site assessment or dosimetry.

Computer models such as the widely used VARSKIN computer code can be used to calculate skin dose from data representing the radioactive contamination. These computational models, however, do not measure dose directly from actual measurements of radiation. Also, using these computational models, skin dosimetry as a function of depth following contamination occurs at a later time and place after much preparation and characterization of the radiation source.

Some known skin dosimetry devices use a scintillator to measure a counting rate of a single type of radiation at a specific energy and estimate a corresponding dose in skin tissue. Although such devices provide real-time information, they are limited to a small energy range of a single type of radiation and fail to provide an estimate of the dose due to other types of radiation. Nor do they provide estimates of dose at various skin depths.

Scintillation detectors have been used for many years in various applications for the general purpose measurement of different types of radiation including alpha, beta, gamma and neutron energy deposition. Of particular significance are the devices and techniques for simultaneous beta and gamma spectroscopy that were developed by two of the present inventors and described in U.S. Pat. No. 7,683,334, which is incorporated herein by reference. This earlier work, however, did not provide any device or technique for skin dosimetry.

SUMMARY OF THE INVENTION

The field of skin dosimetry has a long-standing need for a real-time absolute dosimeter that can measure dose at various tissue depths simultaneously. A real-time skin contamination dosimeter that measures energy deposition to the skin from ionizing radiation would be quite useful, e.g., for compliance demonstration with 10 CFR 20 and for hazard assessment following skin radiation exposure. Accordingly, in one aspect, the present invention provides a technique and device for absolute skin dosimetry in real time at multiple tissue depths (up to three) simultaneously. The technique also provides skin dose averaging consistent with Nuclear Regulatory Commission (NRC) regulation.

In one aspect, a method for skin dosimetry includes measuring by a digital pulse processor connected to a triple-layer phoswich detector a differential distribution (dN/dH) of count rate N as function of pulse height H for each of multiple scintillators embedded at multiple corresponding depths within a non-scintillating material in the phoswich detector. A digital processor computes in real time from the differential count-rate distribution for each of multiple scintillators an estimate of an ionizing radiation dose delivered to each of multiple depths of skin tissue corresponding to the multiple scintillators embedded at multiple corresponding depths within the non-scintillating material. The non-scintillating material is preferably tissue-equivalent plastic. The multiple depths of the multiple scintillation layers may be customized values based on a selection by a user. For example, the multiple depths of the multiple scintillation layers may be 70, 3000, and 10000 microns, respectively.

The estimate of the ionizing radiation dose may be computed by binning the differential count-rate distribution as function of pulse height H into pulse-height bins of equal width, converting the binned differential count-rate distribution as a function of pulse height into a binned pulse-height distribution as a function of deposited energy, computing an energy absorption distribution from the binned pulse-height distribution as a function of deposited energy, integrating the energy absorption distribution to obtain a total energy deposited, and calculating the estimated dose from the total energy and the mass of the scintillation layer. The estimated dose may be calculated also from a stopping power coefficient (for ionizing particle dose) or from an energy absorption coefficient (for gamma ray dose).

BRIEF DESCRIPTION OF THE DRAWINGS

FIG. 4 is a flowchart outlining steps for computing an ionizing radiation dose from a differential count-rate distribution according to an embodiment of the invention.

DETAILED DESCRIPTION

Figure 1:
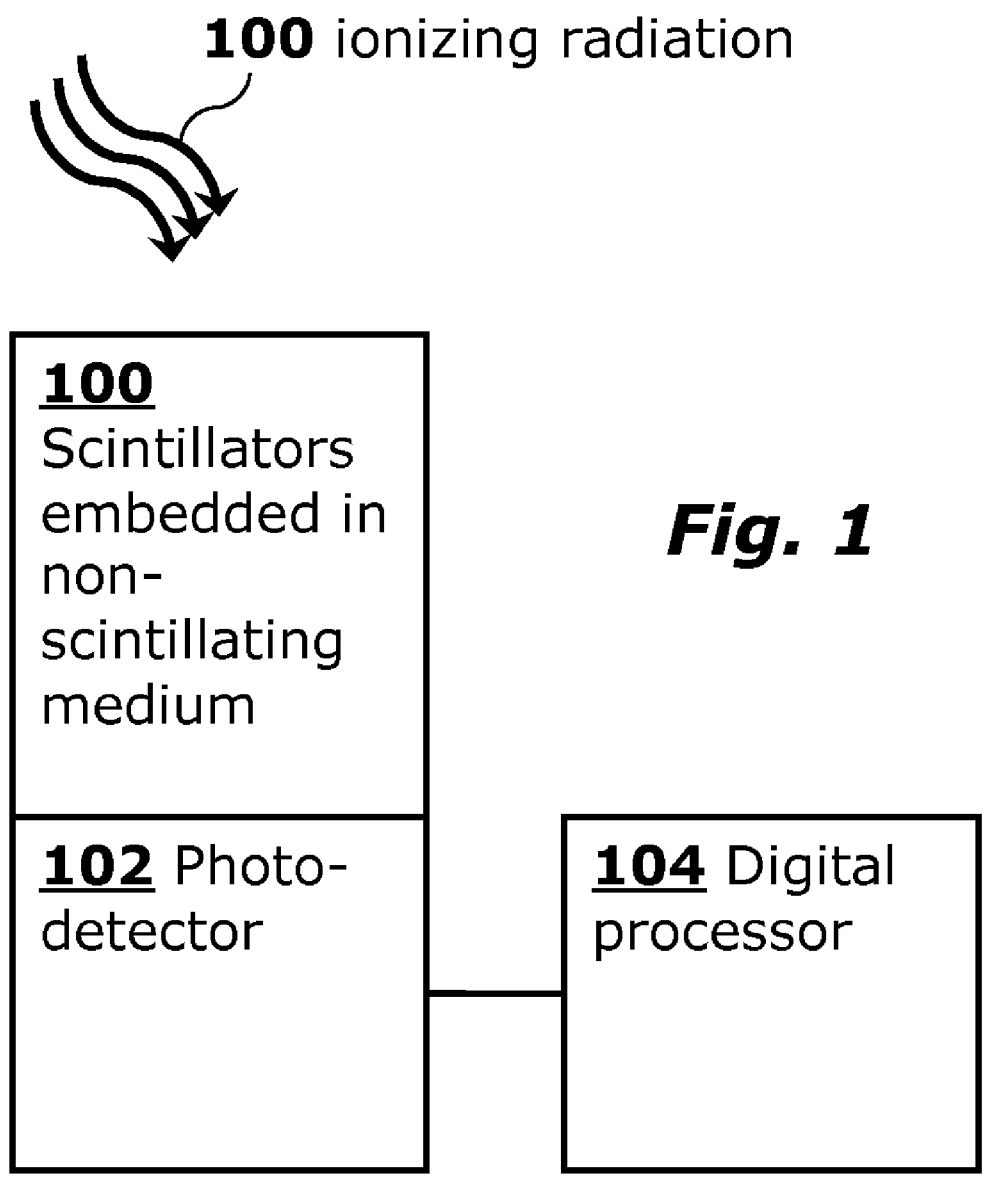
FIG. 1 is a schematic diagram of a digital radiation detection device for real-time dosimetry for multiple layers of skin according to an embodiment of the invention.
Figure 2:
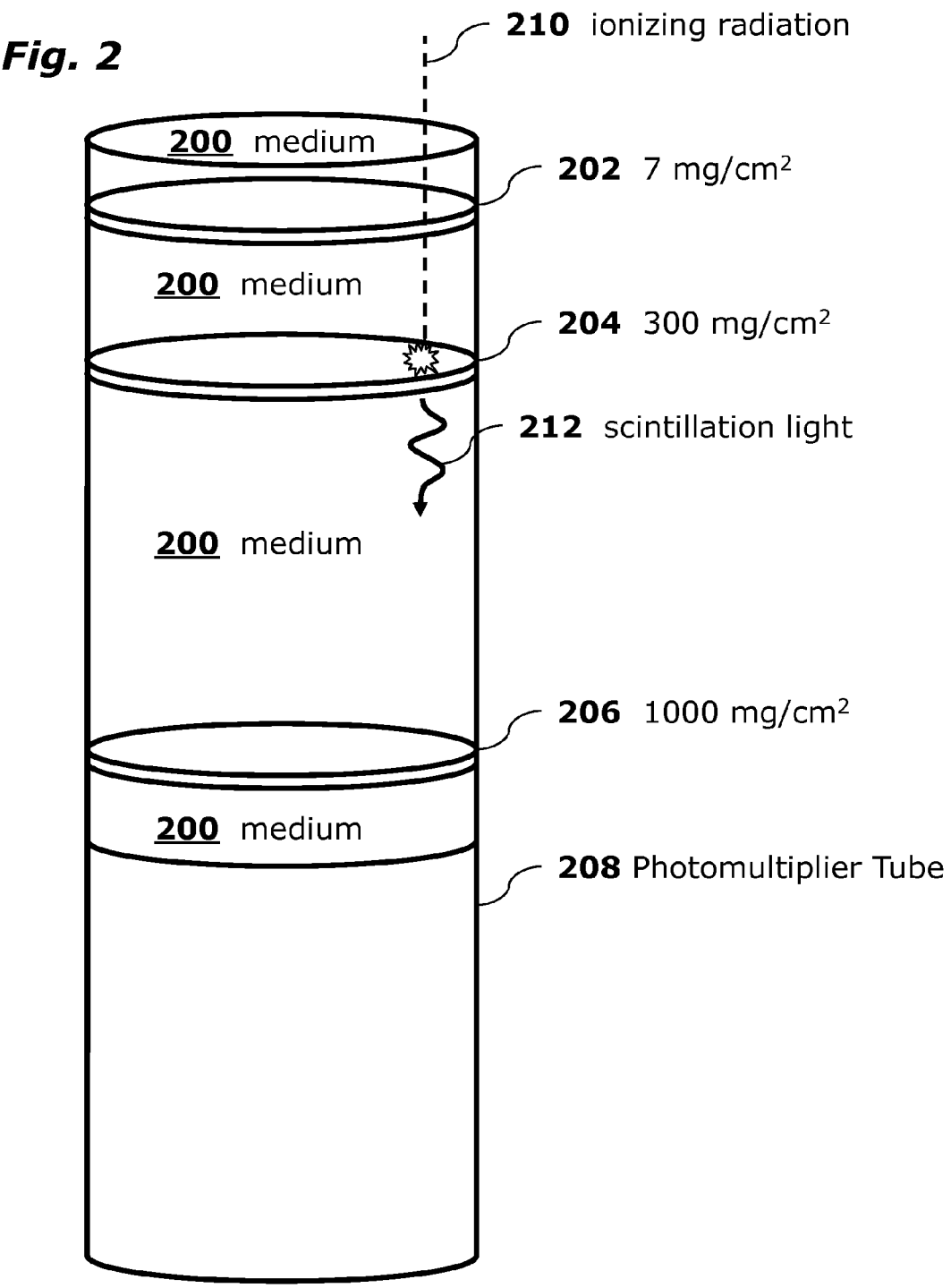
FIG. 2 is a schematic diagram including the details of the scintillators and photodetector shown in FIG. 1.

FIG. 1 is a schematic diagram of a digital radiation detection device for real-time dosimetry for multiple layers of skin according to an embodiment of the invention. This device includes a triple-layered scintillation detector 100 coupled optically to a photodetector 102 electrically connected to a high-speed digital pulse processor 104 which measures radiation energy-deposition events and calculates radiation dose (energy deposition per unit mass) to skin tissue at up to three depths due to ionizing radiation emissions. Digital processor 104 may include, for example, a preamplifier, Nyquist filter, analog to digital converter, and field programmable gate array for pulse measurement. Subsequent pulse analysis may be performed, for example, by an application-specific integrated circuit, field programmable gate array, general purpose microprocessor, or other digital processor. The scintillators 100 and photodetector 102 are shown in more detail in FIG. 2. Three depths in tissue are simulated by three thin scintillators 202, 204, 206 embedded in a non-scintillating medium 200 such as inert plastic. The scintillators 202, 204, 206 are interchangeable, can be placed at varying depths, and preferably have active areas of either 1 cm$^2$ or 10 cm$^2$, depending on the desired dose averaging area. The current NRC regulation requires an averaging area of 10 cm$^2$.

A conventional phosphor sandwich (phoswich) detector is a type of radiation detector commonly used for detecting multiple types of radiation in a mixed radiation field with two scintillating layers. A phoswich detector has a combination of scintillators optically coupled to a single photodetector, typically a photomultiplier tube. The scintillators are selected so that their primary difference is their different decay times. Consequently, radiation incident on the device may interact with one of the scintillation layers and produce a photomultiplier pulse with a characteristic shape. Analysis of the shape of the output pulse from the photomultiplier tube can then be used to determine the layer in which the radiation energy was deposited.

In contrast with conventional phoswich technology, the present skin contamination dosimeter uses a triple-layer design in which three scintillators are coupled to one light collection device. This triple-layer design has been used in another method to differentiate charged particle interactions from photon interactions in a single detector, as described in U.S. Pat. No. 7,683,334, which is incorporated herein by reference. The present skin dosimeter can be applied such that the three scintillating layers reside at depths critical to skin/tissue hazard assessment (e.g. 70, 3000, 10000 microns). Applications at other depths, if desired, can be accommodated during manufacture. Normally 7, 300, 1000 mg/cm$^2$ (or 70, 3000, 10000 microns) would be chosen in most embodiments (because those depths are in regulation), but some biological lab, for example, may be interested in measuring dose at other depths, in which case the device design would be customized using the principles of the present invention by changing spacer thicknesses.

This dosimeter is designed to be sensitive to various types of radiation, just as sensitive as skin would be. Each scintillation layer is designed to measure the energy deposited by any radiation type at a particular depth.

Preferably, the each scintillator material is a scintillating plastic. Because of decay times, an inorganic scintillator may be included in some embodiments. Such inorganic scintillators are not ideal because of their higher density and because they are not tissue equivalent. However, corrections can be made to compensate for these deviations.

Some embodiments include a cover over the opening of the detector. In general, such a cover may be made of any material sufficiently thick and durable to prevent unwanted light from entering the detector. A cover, for example, may be a 10 micron thick aluminum layer.

The scintillating layers are sandwiched between layers of inert (non-scintillating) plastic 200 so as to create a continuous plastic cylinder that best simulates the interactions of charged particles and photons in tissue.

The mass of the scintillator is proportional to its volume. The scintillator is ideally infinitely thin (tens of microns in our case) so as to measure radiation energy deposition at a specific tissue depth, and its area is dictated by the area over which dose is to be averaged. The current federal regulations (10 CFR 20) require a dose averaging area of 10 cm$^2$, therefore, the device is constructed such that each scintillating disk has that dimension. The International Commission on Radiological Protection (ICRP) recommends skin dose be averaged over an area of 1 cm$^2$. The detector can be modified to whichever averaging area is of importance to the user. In the design, inert plastic is added concentrically around the active scintillators so as to simulate skin surrounding the dose-averaging area, thus providing for appropriate scatter.

The device has the ability to measure dose at various skin depths. For example, the configuration shown in FIG. 2 has three scintillators for measuring three skin depths of 0.007 cm "shallow", 0.3 cm "eye", and 1 cm "deep". These three scintillators have corresponding density thickness of 7 mg/cm$^2$, 300 mg/cm$^2$, 1000 mg/cm$^2$, respectively. In another embodiment, a scintillator for skin depth of 0.1 cm "biological" is embedded with a density thickness of 100 mg/cm$^2$.

Incident ionizing radiation 210 enters the device and interacts with a scintillator such as scintillator 204, producing scintillation light 212 that is then detected by a photodetector 208 such as a photomultiplier tube. Signals from the photodetector 208 are then processed to construct an energy deposition spectra at each of the depths and to calculate in real-time the dose rate received by the skin at each depth as a result of the decay of the radionuclide contamination on the skin surface, or on clothing covering the skin.

The digital processor 104 (FIG. 1) operates to discriminate between energy depositions in the various scintillation layers, to estimate the particulate and photon energy absorbed in the skin, and to calculate the associated radiation dose at three depths in the skin. In the preferred embodiment, the device uses phoswich detector technology, digital signal processing, and on-board dosimetric algorithms to accomplish the goal of real-time skin contamination dosimetry from ionizing radiation energy absorption in the skin.

Figure 3:
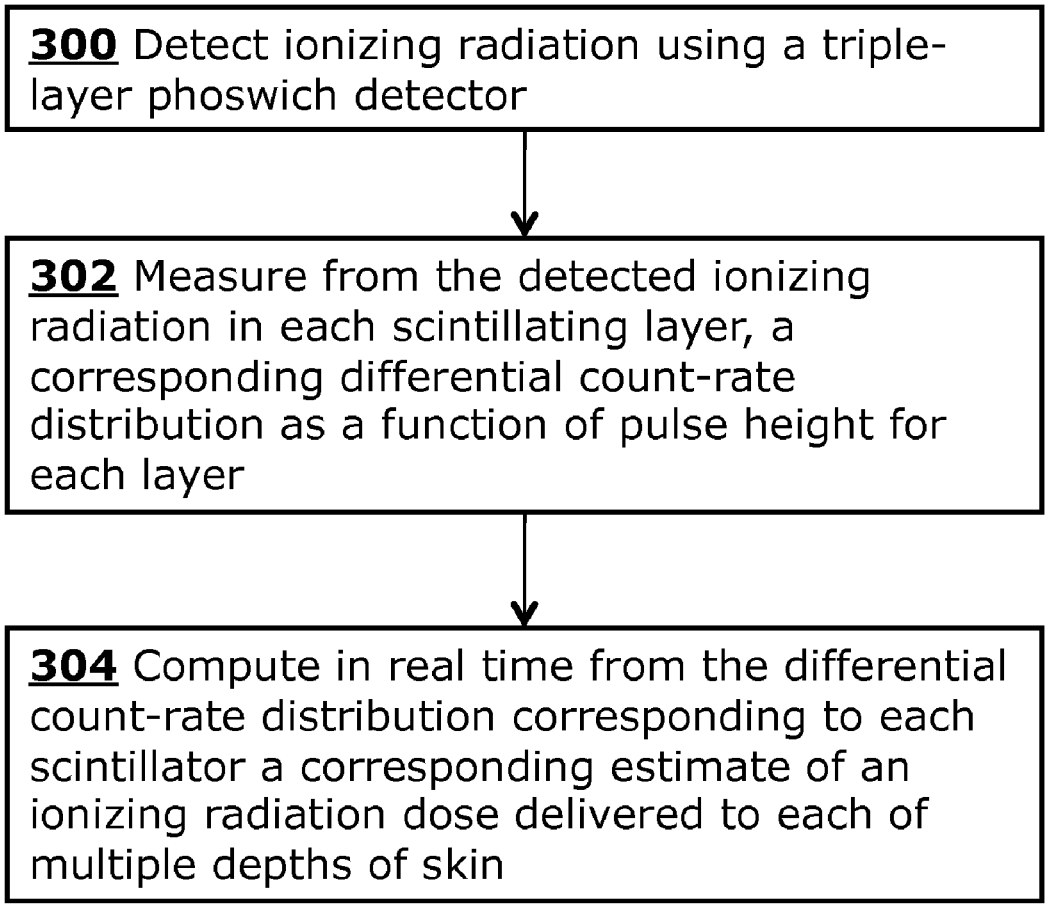
FIG. 3 is a flowchart illustrating an outline of a method for dosimetry according to an embodiment of the invention.

FIG. 3 is a flowchart illustrating an outline of a method for dosimetry according to an embodiment of the invention. In step 300 ionizing radiation is detected using a triple-layer phoswich detector. Signals may be detected by multiple scintillators positioned at multiple depths. As radiation energy is deposited in a given scintillating layer, measured by visible light output from the scintillators and read by a light collection device, a differential count-rate distribution, (dN/dH) is measured and recorded for each layer as a function of (voltage) pulse height, H. This is shown in step 302 where a differential count-rate distribution as a function of pulse height is calculated from the detected ionizing radiation signal from each scintillator. In step 304 an estimate of an ionizing radiation dose delivered to each of multiple depths of skin is computed in real time from the differential count-rate distributions from corresponding multiple scintillators.

The details of step 304 are outlined in the flowchart of FIG. 4. In step 400, the differential count-rate distribution as a function of pulse height H for a given layer is binned into pulse-height bins of equal width. For example, the pulse heights (voltage amplitudes) in the distribution may range from zero volts to nominally 10 volts. This range is divided into B voltage or pulse-height bins, each of equal width, and each pulse classified into one bin according to its pulse height. In step 402, a calibration relating H, height (amplitude) of the signal pulse, to E, energy deposition, is applied thereby creating a differential pulse-height distribution, (dN/dE), as a function of deposited energy, E. This results in B energy bins of equal width, $\Delta E$, and a mean value of each energy bin given by $E_i$ where i represents the i-th energy bin. In step 404, the energy-calibrated pulse-height deposition distribution is then converted to an energy-absorption distribution, $E_i(dN/dE)$ by multiplying the mean value of each energy bin, $E_i$, by the count rate in that bin, as a function of energy, E. In step 406, the system then integrates over B energy bins to determine T, the total energy deposited in the given scintillator layer:

$$T = \Sigma_{i=1,\ldots,B} E_i (dN/dE) \Delta E$$

Once total energy deposition is determined for a given scintillator, the dose, $D_s$ delivered to that scintillator, of mass m, is calculated in step 408 by, $$D_s = T/m$$

Step 408 may also include conversion of scintillator dose to tissue dose by multiplying $D_s$ by the appropriate ratios of stopping power or mass energy absorption coefficient. The selection of inert plastic is made specifically to establish this ratio of stopping powers and absorption coefficients to be near unity (i.e., tissue equivalent materials).

The calculated dose estimates are calculated as described above for each layer in real time and then are preferably stored in memory, output to a display and/or sent as electronic data to another device for further analysis, recording, documentation, or other uses.

The accuracy of the skin contamination dosimeter may be benchmarked computationally with Monte Carlo (MCNP) particle transport simulation software, and against the NRC-accepted VARSKIN software. Its accuracy may also be benchmarked in the laboratory against film dosimetry measurements.

The invention claimed is:

1. A method for skin dosimetry comprising:
   measuring by a digital pulse processor connected to a triple-layer phoswich detector a differential count-rate distribution (dN/dH) as function of pulse height H for each of three scintillators embedded at three corresponding depths within a non-scintillating material in the phoswich detector; and
   computing by a digital processor in real time from the differential count-rate distribution for each of three scintillators an estimate of an ionizing radiation dose delivered to each of three depths of skin tissue corresponding to the three scintillators embedded at three corresponding depths within the non-scintillating material.

2. The method of claim 1 wherein the non-scintillating material is tissue-equivalent plastic.

3. The method of claim 1 wherein the three depths of the three scintillation layers are customized values based on a selection by a user.

4. The method of claim 1 wherein the three depths of the three scintillation layers are 70, 3000, and 10000 microns, respectively.

5. The method of claim 1 wherein computing the estimate of the ionizing radiation dose comprises:
   binning the differential count-rate distribution as function of pulse height H into pulse-height bins of equal width,
   converting the binned differential count-rate distribution as a function of pulse height into a binned pulse-height distribution as a function of deposited energy,
   computing an energy absorption distribution from the binned pulse-height distribution as a function of deposited energy,
   integrating the energy absorption distribution to obtain a total energy deposited, and
   calculating the estimated dose from the total energy and the mass of the scintillation layer.

6. The method of claim 5 wherein the estimated dose is calculated also from a stopping power coefficient, providing a dose estimate from ionizing particles.

7. The method of claim 5 wherein the estimated dose is calculated also from an energy absorption coefficient, providing a dose estimate from ionizing photons.

* * * * *